United States Patent
Hall et al.

(10) Patent No.: US 8,278,590 B2
(45) Date of Patent: Oct. 2, 2012

(54) APPARATUS FOR MINIMIZING A HEAT AFFECTED ZONE DURING LASER MICRO-MACHINING

(75) Inventors: Brian Hall, Nashua, NH (US); David S. Holbrook, Lexington, MA (US); David L. Wall, Burlington, MA (US)

(73) Assignee: Resonetics, LLC, Nashua, NH (US)

( * ) Notice: Subject to any disclaimer, the term of this patent is extended or adjusted under 35 U.S.C. 154(b) by 1319 days.

(21) Appl. No.: 11/140,341

(22) Filed: May 27, 2005

(65) Prior Publication Data

US 2006/0266742 A1    Nov. 30, 2006

(51) Int. Cl.
*B23K 26/00*    (2006.01)
*B23K 26/06*    (2006.01)

(52) U.S. Cl. .............................. 219/121.69; 219/121.73

(58) Field of Classification Search ............. 219/121.68, 219/121.69, 121.73, 121.75, 121.77; 264/400; B23K 26/067
See application file for complete search history.

(56) References Cited

U.S. PATENT DOCUMENTS

| | | | | |
|---|---|---|---|---|
| 4,128,752 A * | 12/1978 | Gravel | ...................... | 219/121.68 |
| 5,463,200 A * | 10/1995 | James et al. | ............. | 219/121.68 |
| 6,215,596 B1 * | 4/2001 | Araki et al. | .................... | 359/631 |
| 6,285,001 B1 * | 9/2001 | Fleming et al. | ........... | 219/121.72 |
| 6,353,218 B1 * | 3/2002 | Yamazaki et al. | ............ | 250/216 |
| 6,366,339 B1 * | 4/2002 | Gelbart | ........................... | 355/67 |
| 6,393,042 B1 * | 5/2002 | Tanaka | .......................... | 372/101 |
| 6,577,380 B1 * | 6/2003 | Farmiga et al. | ................ | 355/67 |
| 6,750,423 B2 * | 6/2004 | Tanaka et al. | ............. | 219/121.73 |
| 7,057,135 B2 * | 6/2006 | Li | .............................. | 219/121.83 |
| 7,148,447 B2 * | 12/2006 | Ehrmann et al. | ......... | 219/121.73 |
| 7,371,993 B2 * | 5/2008 | Bann et al. | ................ | 219/121.69 |
| 2004/0188393 A1 * | 9/2004 | Li et al. | ....................... | 219/121.7 |
| 2004/0196559 A1 | 10/2004 | Lissotschenko | ............. | 359/619 |
| 2004/0223330 A1 * | 11/2004 | Broude et al. | ................ | 362/268 |
| 2006/0018025 A1 * | 1/2006 | Sharon et al. | ................ | 359/618 |

* cited by examiner

*Primary Examiner* — Sang Paik
(74) *Attorney, Agent, or Firm* — Mintz Levin Cohn Ferris Glovsky and Popeo, P.C.

(57) ABSTRACT

Embodiments of the present invention are directed to methods and systems for laser micro-machining, which may include dividing a long line illumination field into a plurality of individual fields, wherein each of the plurality of fields includes an aspect ratio of about 4:1 or greater, directing the plurality of individual fields onto at least one mask, wherein each individual field illuminates a corresponding area on the mask and translating the mask and/or workpiece relative to one another along a scan axis.

28 Claims, 5 Drawing Sheets

APPARATUS FOR MINIMIZING A HEAT AFFECTED ZONE DURING LASER MICRO-MACHINING

RELATED APPLICATIONS

This application is related to pending U.S. application Ser. No. 10/839,026, filed May 4, 2004, and U.S. provisional patent application Ser. No. 60/468,511, filed May 7, 2003, each disclosure of which, in its entirety, is herein incorporated by reference.

FIELD OF THE INVENTION

Embodiments of the present invention are directed to machining processes, and more particularly, to laser micro-machining.

BACKGROUND

In micro-machining, a number of different material transformations exist which allow a laser beam to remove or machine material: ionization, melting/boiling, photo-chemical material modification and photo-chemical reaction with process gasses (for example). Material removal is typically accompanied by a plasma plume rising from the surface of the machined regions after a laser pulse is delivered. The duration of the plasma plume is short (typically 1 to 10 microseconds) but it possesses a very high temperature and the ions produced have high velocities.

Through a combination of conduction, convection and radiative transfer of energy from the region of the laser beam's interaction with the machining material and from the plasma plume arising from the decomposition products of the machined material a Heat Affected Zone (HAZ) is created. The heat energy in the HAZ can alter the material properties of the un-machined material in an undesirable manner.

The energy contained in the plasma plume is dependent on raw material composition, laser fluence and the contiguous area of the machining site. Laser fluence is typically set to optimize parameters such as machined edge quality, material removal rate, debris formation and other attributes on the finished part. Accordingly, for a given fluence, the volume of the plasma plume is dependent on the total contiguous area of the machined site. Accordingly, the larger the area, the larger the plasma plume volume. Moreover, the volume of the plasma plume determines the magnitude of localized heating (i.e., the HAZ) of the perimeter of the machining site.

Figure 1A:
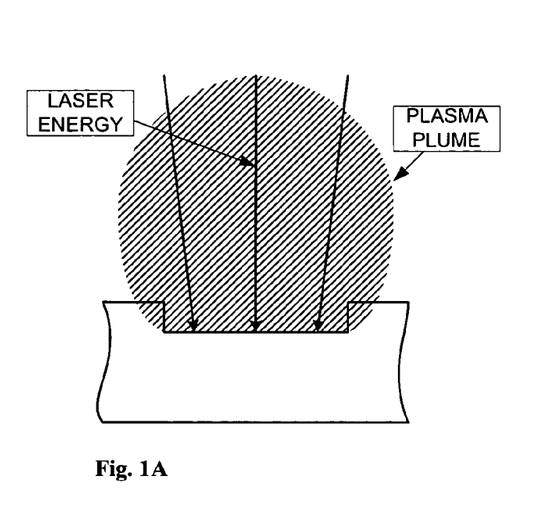
FIG. 1A illustrates a laser plume associated with laser micro-machining a workpiece according to the prior art.
Figure 1B:
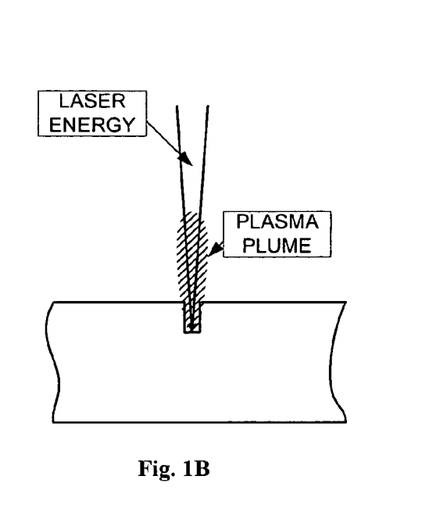
FIG. 1B illustrates a laser plume associated with laser micro-machining according to embodiments of the present invention.

Larger plumes do not get cooled or quenched as quickly as smaller plumes since there is proportionately less surface area exposed to the air relative to the volume of the plume. For example, FIG. 1A illustrates a relatively large contiguous area being machined and an associated large plasma plume, while FIG. 1B illustrates a small plume associated with a smaller machined area. Thus, the smaller plume will be cooled/quenched quicker since a larger fraction of the plasma plume surface area is in contact with air.

For many materials undergoing pulsed laser micro-machining, the maximum laser pulse repetition rate is limited to a rate that produces an acceptable Heat Affected Zone (HAZ). When the laser pulse rate is too high, the magnitude and rate of plasma formation cause heating of un-machined material around the machined area causing an unacceptable HAZ. Although it is possible to reduce the laser pulse rate to allow material cooling between pulses, such a reduction results in a direct decrease in the throughput of the machining process. Thus, throughput of laser micro-machining could be increased if the one were able to limit the volume of the plume associated with the machined area.

SUMMARY OF THE INVENTION

Accordingly, embodiments of the present invention increase throughput of laser micro-machining by decreasing the ratio of plasma plume volume to machined perimeter length while maintaining the total machining site area. To that end, some embodiments of the invention present methods and systems for minimizing a heated region created during a laser, micro-machining process. This may be accomplished by sub-dividing (for example) the laser beam into noncontiguous machining elements.

Accordingly, in one embodiment of the present invention, a method for laser micro-machining is presented which may include dividing a long line illumination field into a plurality of individual fields, wherein each of the plurality of fields includes an aspect ratio of about 4:1 or greater, directing the plurality of individual fields onto at least one mask, wherein each individual field illuminates a corresponding area on the mask and translating the mask and/or workpiece relative to one another along a scan axis.

In another aspect of the present invention, a system for laser micro-machining is presented and may include an optical source comprising a laser beam, dividing means for dividing a long line illumination field into a plurality of individual fields, wherein each of the plurality of fields includes a aspect ratio of about 4:1 or greater, directing means for directing the plurality of individual fields onto at least one mask, wherein each individual field illuminates a corresponding area on the mask and translating means for translating the mask and/or workpiece relative to one another along a scan axis.

These and other embodiments, objects and advantages of the invention will be readily apparent in view of the attached figures, briefly described below and following detailed description.

DETAILED DESCRIPTION OF THE EMBODIMENTS

Figure 2:
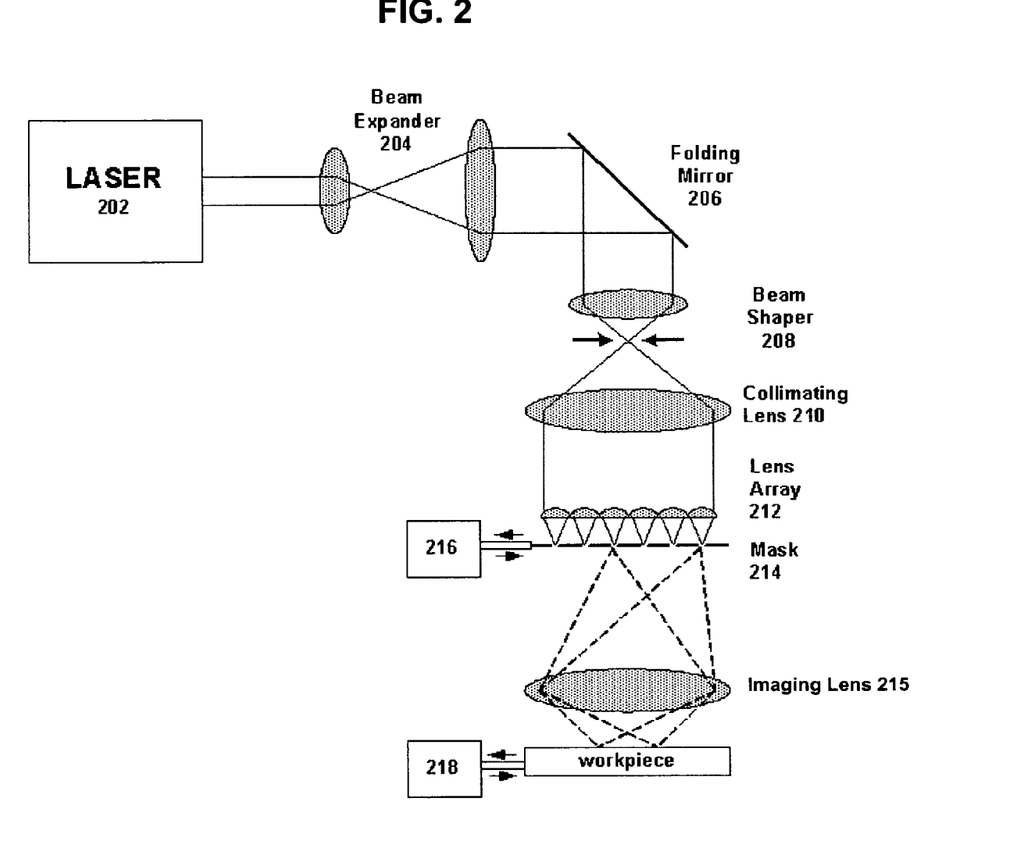
FIG. 2 is a schematic diagram of a laser micro-machining system according to another embodiment of the present invention.

Embodiments of the present invention enable high throughput laser micro-machining while limiting the size of a laser plume. To that end, an exemplary laser micro-machining apparatus which may be used with embodiments of the present invention is shown in FIG. 2. As shown, an illumination source 202 emits a beam of light (laser beam) which is then expanded with a 2-element telescope 204 (for example) and which may be folded down with a 45 degree mirror 206. The light may then brought to focus at a beam shaping aperture 208. The beam shaping aperture may be used as a mask to create an illumination shape (e.g., square, rectangle, triangle, etc.).

The beam shaper plane may then be imaged to infinity (for example) by a collimator lens 210, which then may impinge the beam onto an array 212 of lens elements. Each lens element may then intercept a portion of the collimated beam and forms an image of the beam shaper plane at the mask 214. An imaging lens 215 may then be used to image the projection of the mask on the workpiece. Accordingly, the light emitted by the laser may be efficiently segmented into shapes which illuminate the mask. From the mask, the light is then used to ablate material on the workpiece. Applicants' co-pending U.S. patent application Ser. No. 10/839,026, herein incorporated by reference, also discloses a micro-machining system which may be used with embodiments of the present invention.

It is worth noting that the mask pattern may be a planar or cylindrical pattern (i.e., a planar pattern that has been "unwrapped" from a cylinder onto a planar surface), a magnified image of a planar pattern for a planar workpiece, and that a series of masks may be used—each mask representing a portion of a planar pattern for the workpiece and used sequentially (the series of masks may also be magnified images of portions of the planar pattern).

Figure 3:
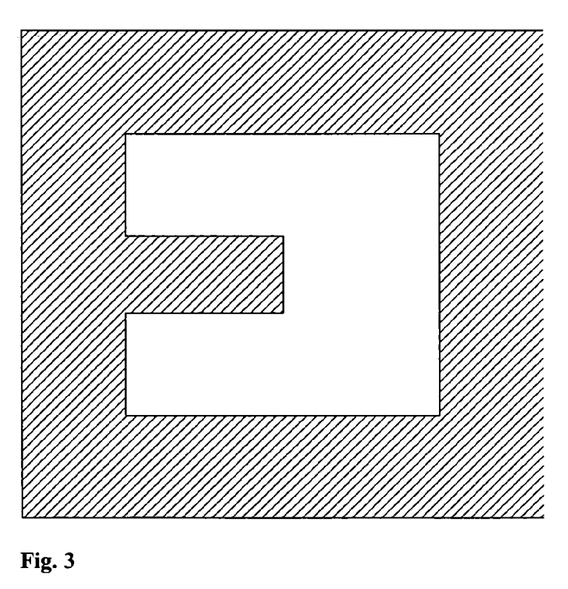
FIG. 3 illustrates an example of a finished part.

FIG. 3 illustrates the geometry of a planar micro-machined part that will be used in the examples that follow. A projected illumination distribution for a laser micro-machining system is generally the product of the illumination distribution of the laser multiplied by the mask transmission function. As shown in FIG. 3, the opaque areas (cross-hatched areas) include a transmission of about zero, while the clear area (white area) includes a transmission near unity (for example). The transmitted illumination distribution may be simultaneously projected on the surface of the raw material to perform the machining operation. To make multiple parts, for example, the illuminated field may be step-and-repeat imaged over the surface of the raw material.

Figure 4:
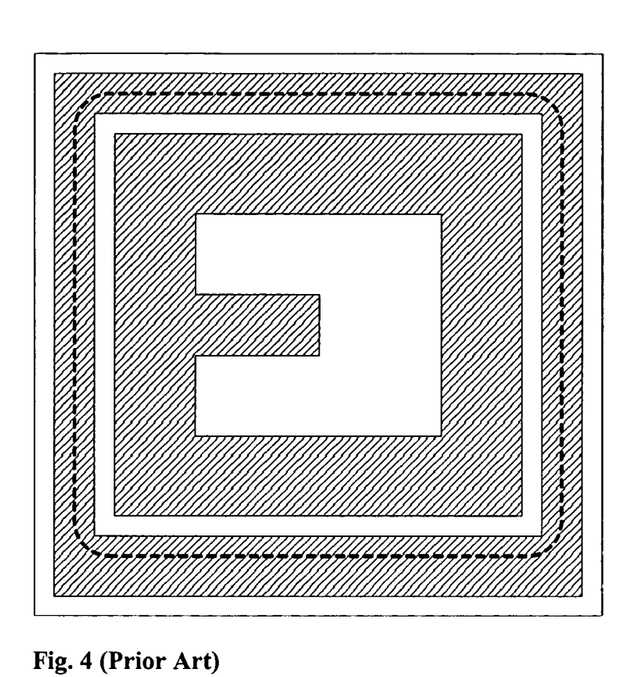
FIG. 4 illustrates a prior art mask projection for laser micro-machining.

FIG. 4 illustrates the image plane of a prior art mask projection micro-machining system. The mask area is illuminated with a uniform beam of laser illumination (dotted line) along a large field. Typically, the field aspect ratio (width to height) of the beam is generally between 1:1 and 2:1. While larger field aspect ratios of the beam are conceivable, one skilled in the art will appreciate that such systems are impractical due to the high cost of constructing a system due to cost and size of the optics involved (e.g., see co-pending application Ser. No. 10/839,026).

With regard to the limited aspect ratio of prior art illumination fields, perimeter to area ratios for 1:1 and 2:1 aspect ratios, for example correspond to a perimeter to area ratios of 4:1 and 4.2:1, respectively (e.g., assuming a one (1) centimeter field area). Accordingly, some embodiments of the present invention increase such perimeter to area ratios to minimize the HAZ to an acceptable level, e.g., a level which does not impact material properties. This results in an increased throughput of a laser micro-machining system.

Figure 5:
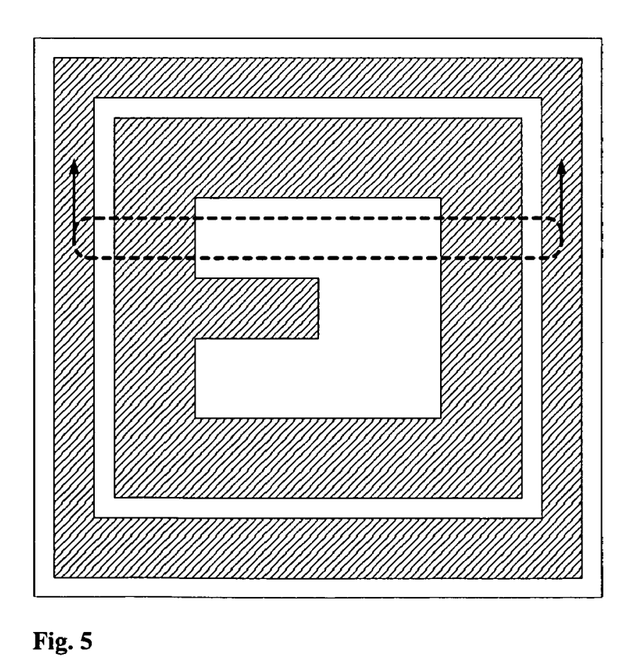
FIG. 5 illustrates an example of a mask projection for laser micro-machining according to an embodiment of the present invention.

Accordingly, FIG. 5 illustrates one embodiment of the invention where the illuminated field (dotted line) includes a long line shape having an increased aspect ratio. The increased aspect ratio results in a higher ratio of perimeter to area which results in a greater percentage of the plasma plume volume being quenched, thereby limiting HAZ. In FIG. 5, for example, a one (1) centimeter field area may correspond to a 20:1 aspect ratio and a 9.4:1 perimeter to area ratio. The high aspect illumination field may be generated using the system disclosed in Applicants' co-pending U.S. patent application Ser. No. 10/839,026.

It is another feature of the long line embodiment illustrated in FIG. 5 that the overall amount of material removed from the workpiece may be reduced due to a stenciling configuration incorporated into the mask design (for example). Specifically, as can be seen in FIG. 4, more material (e.g., additional material at the top and bottom) is removed in the prior art, while only a slug of residual material is produced at the center of the part in the current embodiment (FIG. 5). This also reduces the thermal loading of the un-machined material.

Figure 6:
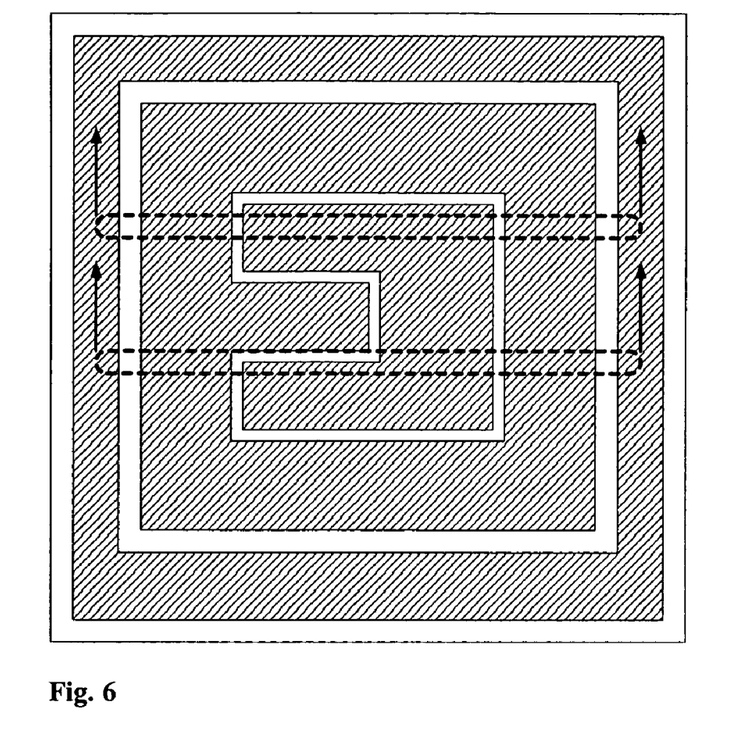
FIG. 6 illustrates another example of a mask projection for laser micro-machining according to another embodiment of the present invention.

FIG. 6 illustrates yet another embodiment of the invention. In this embodiment, the illuminated field area is further subdivided into a plurality of long linear fields (i.e., high aspect ratio fields). In this case, the mask may be translated through the array of illuminated fields and/or the workpiece is moved relative to the mask (e.g., in opposite directions) to execute COM scanning. Some embodiments of the invention allow for the relative translation of the mask and workpiece in opposite directions multiple times. As shown in FIG. 2, actuator(s) 216 (or other moving means; e.g., a linear motor driven support plate, and the like) may move the mask pattern relative to the workpiece (e.g., along a line, in/around a plane and/or rotationally). Moreover, the workpiece may also include an additional actuator(s) 218, which may be used in addition to or in place of the actuator(s) 216 of the mask, to accomplish the relative movement (e.g., along a line, in/around a plane and/or rotationally) between the mask and workpiece.

It is worth noting, that a particular advantage of the present embodiment is that the increased subdivision of the illuminated fields may maintain machining throughput and provides a further enhancement to quench the plasma plume and further diminish HAZ. Moreover, the division of the field area into a plurality of long line fields provides an even more substantial improvement in the perimeter to area ratio. For example, a one (1) square centimeter field can be subdivided into 20 fields, each having a 20:1 aspect ratio. Such an aspect ratio then corresponds to a perimeter to area ratio of 42:1 (for example).

Figure 7:
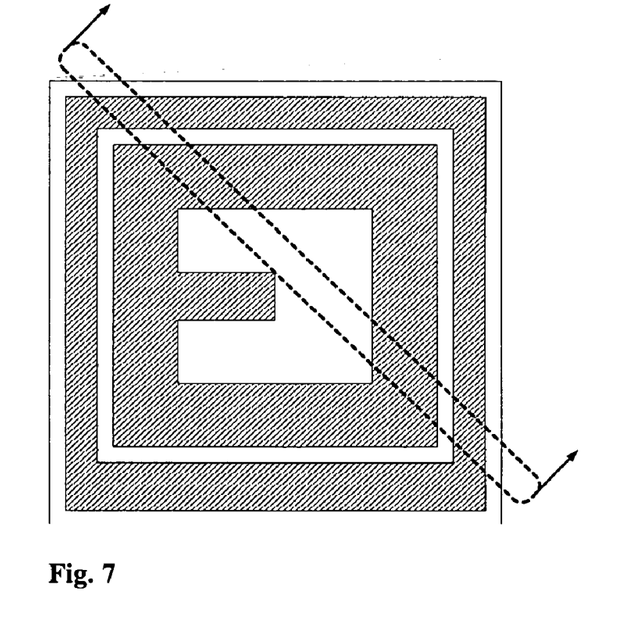
FIG. 7 illustrates still another example of a mask projection for laser micro-machining according to anther embodiment of the present invention.

In the case where machined cuts are oriented in a rectilinear manner, the fields of illumination may be made into curved shape and/or oriented at angles other than 0 degrees or 90 degrees. For example, FIG. 7 illustrates a case where the scanning direction is oriented so that it is mis-aligned with the linear cut geometry of the part (e.g., at a 45 degree angle thereto). Exemplary configurations of this embodiment may include:

a) rotation of the illumination field and scan axis with respect to the mask (as shown in FIG. 7);
b) rotation of the mask with respect to the illumination field and scan axis; and
c) rotation of only the illumination field.

Figure 8:
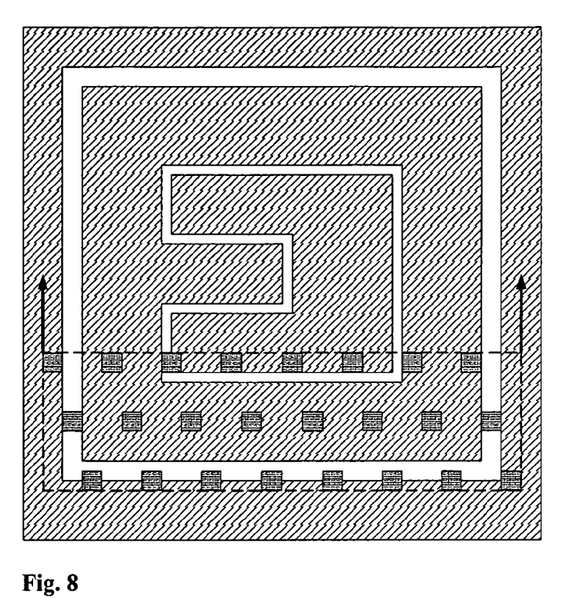
FIG. 8 illustrates still yet another example of a mask projection for laser micro-machining according to another embodiment of the present invention.
Figure 9:
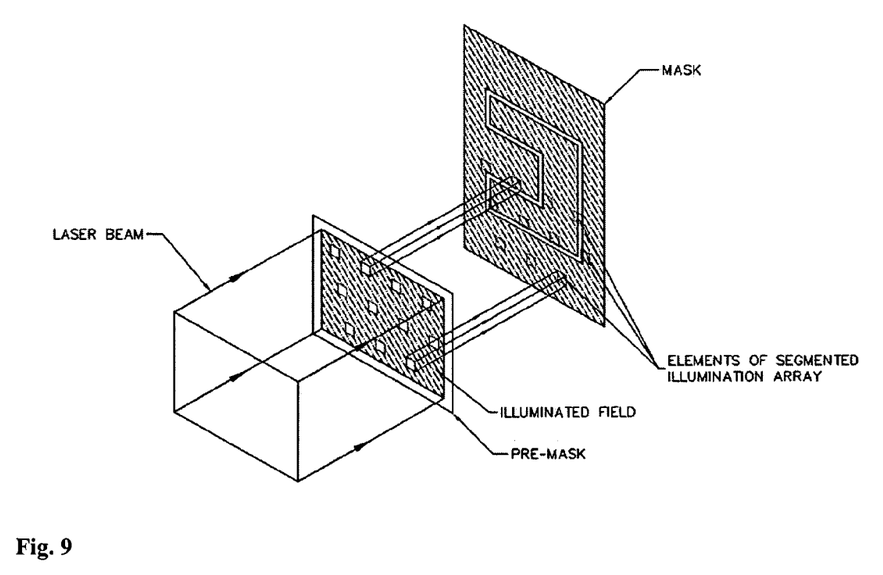
FIG. 9 is a schematic diagram of components to a laser micro-machining system according to another embodiment of the present invention.

FIGS. 8 and 9 illustrate yet another embodiment whereby long line illumination fields may be subdivided into still smaller regions (e.g., square) which provide an even greater plasma plume quenching (i.e. a greater ratio of perimeter to area). For example, a full-segmentation COM configuration for this embodiment may resemble a halftone illumination pattern which may be dithered to scan the illumination regions over the surface of the mask. Accordingly, if a one (1) square centimeter field is segmented into a 20 row by 20 column grid of small square fields of illumination, the perimeter to area ratio increases to 80:1.

Additional Embodiments

Other embodiments of the invention may include a laser micromachining apparatus, such as (for example) a laser micromachining apparatus for copying an image of a planar mask onto a planar or cylindrical workpiece. This may be accomplished by translating the mask and planar workpiece synchronously, or translating the mask and rotating the cylindrical workpiece synchronously. Accordingly, at a given instance, the laser illuminates a selected area on the mask. An imaging system (e.g., lens) may be used to image this selected area on the surface of a planar or cylindrical workpiece.

Still other embodiments of the invention may include a mask pattern which may be a representation of the planar image. The mask may be translated in a linear fashion while the workpiece is translated parallel to the mask motion. By synchronously translating the mask from one end of the pattern to the other, while translating the planar workpiece relative to the mask, an entire pattern can be imaged from the planar mask to the planar workpiece. The mask and workpiece may be translated in opposite directions since the projection lens inverts the image of the mask.

In still other embodiments of the invention, the mask pattern may be a representation of the unwrapped image of the cylinder, where the mask may be translated in a linear fashion while the cylindrical workpiece is rotated about an axis (e.g., of the cylinder). The cylinder and it rotation mechanism are preferably oriented such that the optical axis of the imaging system is perpendicular to its surface. By synchronously translating the mask from one end of the pattern to the other while simultaneously rotating the cylinder about its axis for a full rotation, the entire pattern can be imaged from the planar mask to the cylindrical surface. The mask may also be translated and the cylinder rotated such that the relative motions are in opposite directions since the projection lens inverts the image of the mask.

The above noted embodiments enable high speed/throughput in a laser micro-machining system which, as indicated above, may be achieved by imaging a long line perpendicular to the direction of translation of a planar workpiece, or parallel to the axis of a cylinder.

However, in some embodiments, it may be necessary to limit the width of the image parallel to the scan direction of the mask because of the depth of focus of the imaging system and the curvature of the cylinder. This may be accomplished through the use of a pre-mask aperture (see FIG. 9), which defines the instantaneous area of the mask pattern to be transmitted. The pre-mask aperture may be used to optimize the image width in relation to the depth of focus of the imaging system and the curvature of the cylinder. The pre-mask aperture may also be used to optimize the laser energy delivered locally per unit area per unit time, allowing greater control of ablation rates, and allowing thermally sensitive material to be processed at higher laser pulse repetition frequencies without altering the material.

Having now described a number of embodiments of the present invention, it is apparent to those skilled in the art that the present disclosure is not limited to those embodiments, and that the above embodiments may be used in combination. Moreover, numerous other embodiments and modifications of the disclosed embodiment are contemplated as following within the scope of the present invention and the following claims.

We claim:
1. A method for minimizing a plasma plume generated during laser micro-machining comprising:
   dividing a long line illumination field into a plurality of non-contiguous fields;
   thereafter, directing the plurality of fields onto at least one image mask, wherein:
      the mask includes a pattern for imaging on a workpiece for machining;
      each field illuminates a separate area on the mask and together illuminate only a portion of the mask at a time; and
      the portion of the mask illuminated by the plurality of fields is imaged onto the workpiece; and
   translating the mask and the workpiece relative to the plurality of fields to progressively image the pattern of the mask onto the workpiece, such that, after a single translation, the entire pattern of the mask is imaged onto the workpiece.
2. The method according to claim 1, wherein at least one of the fields comprises a linear or curved shape.
3. The method according to claim 1, wherein at least one of the fields is orientated at an angle to at least one of the mask, the workpiece and the scan axis.
4. The method according to claim 3, wherein the angle is between 0 and 90 degrees.
5. The method according to claim 1, wherein at least one of the plurality of fields is subdivided into a plurality of sub-fields.
6. The method according to claim 1, wherein the workpiece comprises a cylindrical shape and wherein the planar mask is a representation of a planar unwrapped image of the shape.
7. The method according to claim 1, further comprising limiting a width of one or more fields parallel to the scan direction of the mask.
8. The method according to claim 1, wherein the mask is an image of a planar pattern.
9. The method according to claim 1, wherein the mask pattern comprises a magnified image of a planar pattern.
10. The method according to claim 1, wherein the mask and the workpiece are translated in opposite directions.
11. The method according to claim 10, wherein translation occurs multiple times.
12. The method according to claim 1, wherein an image of the mask is projected on the workpiece via an imaging lens.
13. The method according to claim 1, wherein a plurality of masks are used.
14. The method according to claim 13, wherein each mask and an associated portion of the workpiece are utilized sequentially and translated in opposite directions multiple times.
15. The method according to claim 1, wherein:
   the mask projects a plurality of separate images onto a workpiece for ablating material on the workpiece, and
   each image is associated with separate area illuminated by a respective field of the plurality of fields.
16. A system for minimizing a plasma plume generated during laser micro-machining comprising:
   an optical source comprising a laser be
   dividing means for dividing a long line illumination field into a plurality of non-contiguous fields;

directing means for thereafter directing the plurality of fields onto at least one image mask, wherein:

the mask includes a pattern for imaging on a workpiece for machining, each field illuminates a separate area on the mask and together the plurality of fields illuminate only a portion of the mask at a time; and the portion of the mask illuminated by the plurality of fields at the time is imaged onto the workpiece; and translating means for translating the mask and the workpiece relative to the plurality of fields to progressively image the pattern of the mask onto the workpiece, such that, after a single translation, the entire pattern of the mask is imaged onto the workpiece.

17. The system according to claim 16, wherein at least one of the fields comprises a linear or curved shape.

18. The system according to claim 16, wherein at least one of the fields is orientated at an angle to at least one of the mask, the workpiece and the scan axis.

19. The system according to claim 18, wherein the angle is between 0 and 90 degrees.

20. The system according to claim 16, wherein at least one of the plurality of fields is subdivided into a plurality of sub-fields.

21. The system according to claim 16, further comprising a pre-mask aperture.

22. The system according to claim 21, wherein the pre-mask aperture is used to optimize the field width relative to a depth of focus.

23. The system according to claim 21, wherein the pre-mask aperture is used to control and/or optimize the laser energy delivered locally per unit area per unit time.

24. The system according to claim 16, wherein the laser beam is from an excimer laser.

25. The system according to claim 16, wherein the beam is homogenized.

26. The system according to claim 16, wherein the workpiece is cylindrical and positioned such that the laser beam is normally incident to the cylindrical surface.

27. The system according to claim 16, wherein the beam comprises a high aspect ratio rectangular shape having a short axis perpendicular to a direction of translation of the workpiece.

28. The system according to claim 16, wherein:

the mask projects a plurality of separate images onto a workpiece for ablating material on the workpiece, and each image is associated with separate area illuminated by respective field of the plurality of fields.

\* \* \* \* \*

UNITED STATES PATENT AND TRADEMARK OFFICE
CERTIFICATE OF CORRECTION

| | | |
|---|---|---|
| PATENT NO. | : 8,278,590 B2 | Page 1 of 1 |
| APPLICATION NO. | : 11/140341 | |
| DATED | : October 2, 2012 | |
| INVENTOR(S) | : Hall et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1495 days.

Signed and Sealed this
Twenty-ninth Day of March, 2016

Michelle K. Lee
*Director of the United States Patent and Trademark Office*